Feb. 13, 1934. J. W COX 1,946,840
DRINK MIXER
Filed Aug. 11, 1930 2 Sheets-Sheet 1

Witness:
Chas. R. Kursh

Inventor,
John W. Cox
By Fred Gerlach
his Atty.

Feb. 13, 1934.    J. W. COX    1,946,840
DRINK MIXER
Filed Aug. 11, 1930    2 Sheets-Sheet 2
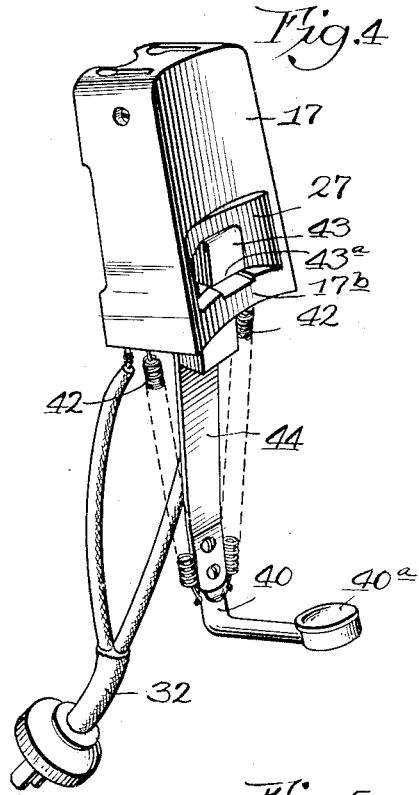
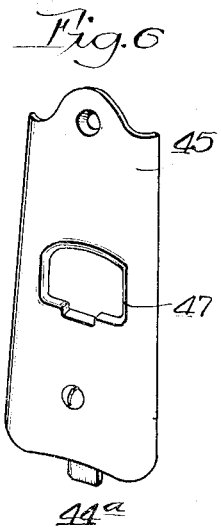
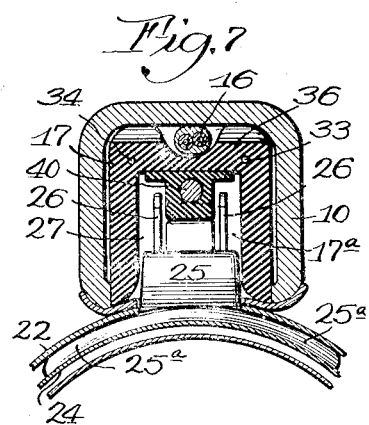
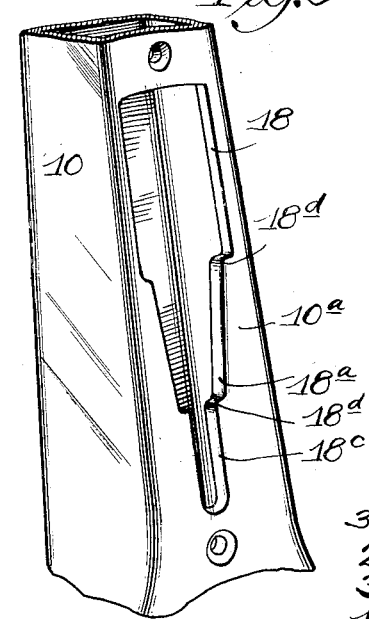
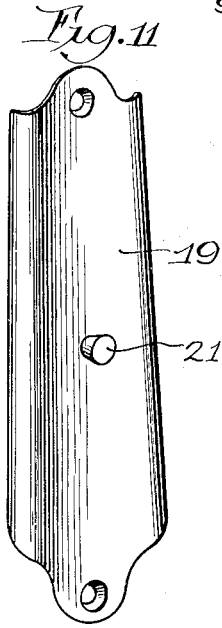
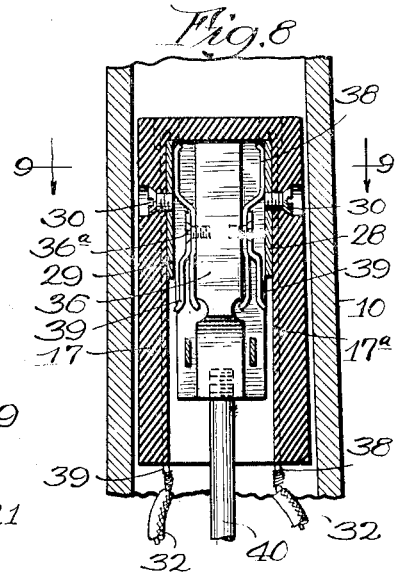
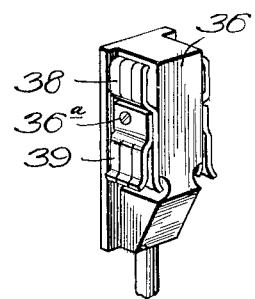
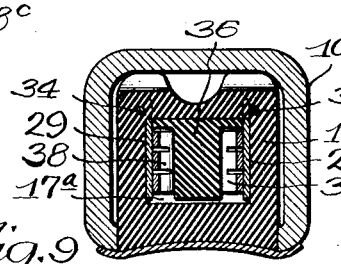

Patented Feb. 13, 1934

1,946,840

UNITED STATES PATENT OFFICE 1,946,840

DRINK MIXER

John W. Cox, Newark, N. J., assignor to The Gilchrist Company, Newark, N. J., a corporation of New Jersey Application August 11, 1930. Serial No. 474,382

31 Claims. (Cl. 219—41)

The invention relates to electric drink mixers.

One object of the invention is to provide a drink mixer which is adapted for use with electrically heated vessels in which the switch for controlling the resistance element for heating the container is mounted on the mixer and is manually controllable independently of the placement of the container in its operative position so the contents of the container may or may not be heated while being mixed.

Another object is to provide an improved drink mixer which can be readily converted for use with an electrically heated container or one without a heater.

Another object of the invention is to provide an improved drink mixer in which the switch for controlling the heater circuit is mounted inside of the supporting column and cannot be closed except when the container is in operative position.

A still further object of the invention is to provide an improved drink mixer in which the mounting for the heater switch is readily removable from the column, and which is provided with a separable plate for supporting a container without a heater.

A still further object of the invention is to provide a drink mixer in which the heater circuit is controlled by a switch which is mounted in or on the supporting column which can be readily and easily manipulated after the container has been placed in its operative position.

A still further object of the invention is to provide an improved drink mixer in which the container is provided with means for unlocking the heater switch.

A further object of the invention is to provide a drink mixer which is equipped with a heater switch comprising stationary and movable contacts carried by the column and which is adapted to be automatically opened when the container is removed.

Other objects will appear from the detailed description.

The invention consists in the several novel features hereinafter set forth and more particularly defined by claims at the conclusion hereof.

Figure 1:
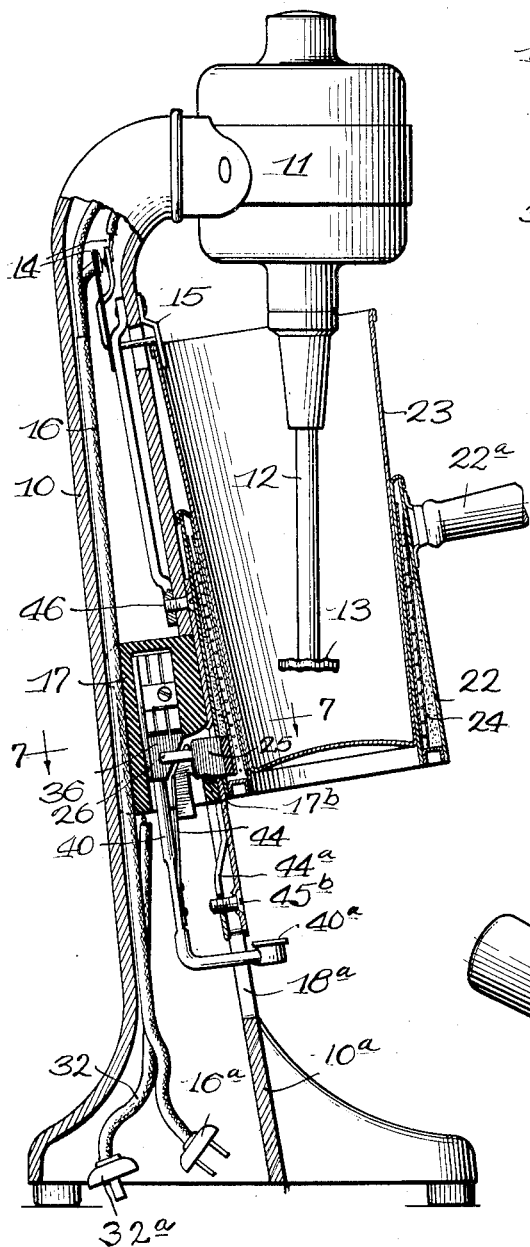
Figure 2:
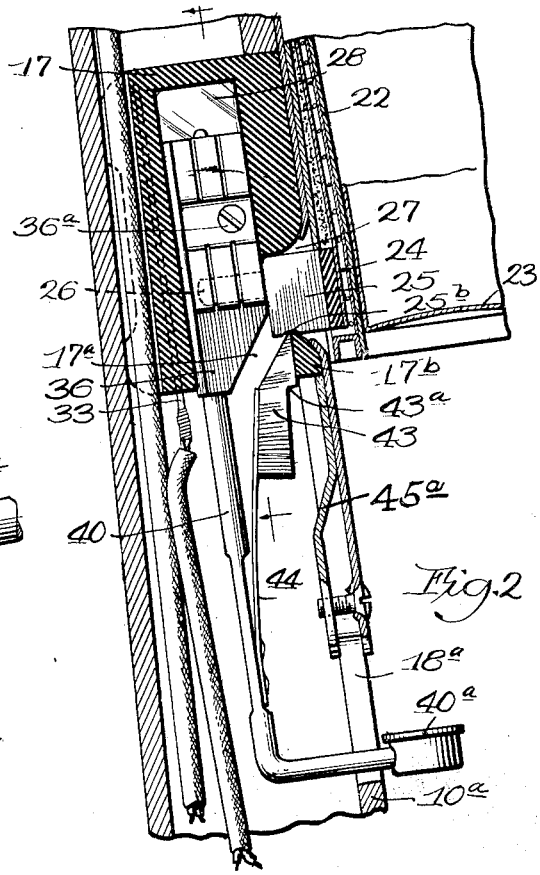
Figure 3:
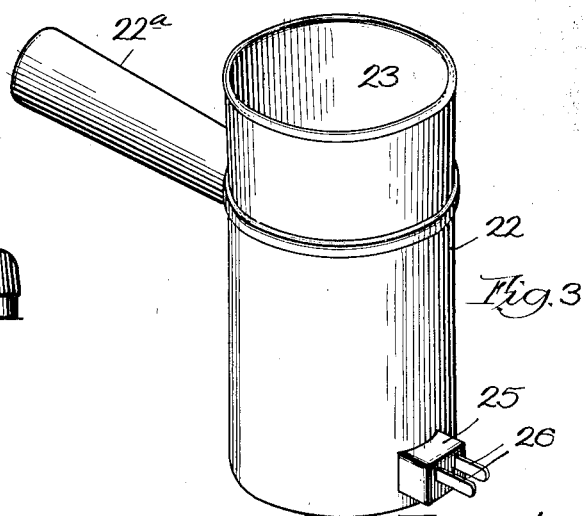

In the drawings: Fig. 1 is a vertical section of a drink mixer embodying the invention, the removable container provided with an electric heater being shown in its operative position and the switch for the heater circuit being shown in its open position. Fig. 2 is a partial section showing the switch operated to close the heater circuit. Fig. 3 is a perspective of the container with the heater. Fig. 4 is a perspective of the removable mounting and the shifting device and conductors for the switch carried by the mounting. Fig. 5 is a perspective showing the opening in the front of the column through which the switch mounting is insertable. Fig. 6 is a perspective of the plate secured to the front of the standard when the mixer is used for hot drinks. Fig. 7 is a section on line 7—7 of Fig. 1. Fig. 8 is a vertical longitudinal section through the heater switch in the column. Fig. 9 is a section on line 9—9 of Fig. 8. Fig. 10 is a perspective of the block which is slidable in the switch mounting and carries the movable contacts of the heater switch. Fig. 11 is a perspective of a substitute plate secured to the front of the column when the heater switch is not used.

The invention is exemplified in a drink mixer comprising a hollow supporting column 10 at the upper end of which is secured an electric motor 11. A shaft 12 depends from the motor-shaft and is provided with an agitator 13. A suitable switch 14 for controlling the operation of the motor by the container is mounted in the upper end of the column, and may be of the construction illustrated and described in Patent No. 1,764,337. A hook 15 is secured to the front face of the column 10 and is adapted to hold the upper portion of a container. A cord 16, comprising a pair of conductors, extends upwardly through the column, and one of its conductors is connected to the switch 14 and its other to the motor, as set forth in the aforesaid patent. The lower end of this cord is connected to a switch-plug 16ª which is adapted to be connected to an ordinary socket, as well understood in the art.

For mixing hot drinks, a container 23 which is provided with an electric heater is used. This container is fitted or held in a suitable casing 22 which contains a resistance element 24 between its inner and outer walls. A member 25 of insulating material has arms 25ª confined within the casing 22 and an integral block or stud which projects from the side of the casing adjacent its lower end, and this block is adapted to enter the standard to support the container 23 vertically. Contact strips 26 extend through member 25 and their inner ends are electrically connected to the terminals of the resistance element 24. The outer ends of contacts 26 project rearwardly from the outer face of member 25 and are adapted to be engaged by a pair of contacts carried in the column 10 when the container has been placed in its operative position around the agitator. A handle 22ᵃ is secured to the casing 22 of the heater.

A block 17 of insulating material is removably held in the column 10. This block constitutes a mounting which is insertable into and removable from the column and carries contacts or a switch for closing a circuit through the resistance element 24 in the casing 22, a device for shifting the switch to close the circuit through the contacts on the heater, a latch for locking the switch in its off position, and conductors for supplying current to the switch, so the mounting and all of the parts carried thereby can be inserted and removed as a unit.

The front wall of mounting 17 is formed with a recess or opening 27 which is adapted to receive the projecting portion of supporting member 25 on the heater, to support the heater and container in operative position around the agitator shaft. This construction exemplifies a removable mounting in the standard adapted to coact with a projection on the side of the heater for supporing the container in its operative position.

Mounting 17 is provided with a vertically extending chamber or socket 17ᵃ, the upper end of which is closed. A pair of contact plates 28, 29 are fixedly secured against the sides of socket 17ᵃ by screws 30 which pass through the mounting from the outer sides thereof and constitute fixed contacts of the heater-switch in the standard. A conductor cord 32 has its lower end secured to a switch-plug 32ᵃ and the conductors of said cord are secured to wires 33, 34 which are electrically connected to contact plates 28, 29 respectively so that when plug 32ᵃ is connected to a switch socket, current will be supplied to the contact plates. A member or block 36 of insulating material is fitted to slide vertically in the socket 17ᵃ of the mounting 17. At each side of member 36 is secured by a screw 36ᵃ, a pair of contact plates 38, 39. The upper end of each slidable contact plate 38 is offset to frictionally engage the inner face of one of the fixed contact plates in the housing. The lower end of each contact plate 39 is offset or spaced from the lower portion of plate 38 so these plates will straddle and frictionally engage one of the contacts 26 on the heater. The slidable contact-carrying member 36 is manually shiftable downwardly to bring the contacts 38, 39 into engagement with the contacts 26 on the heater after the container has been placed in its operative position. For this purpose a rod 40 is secured in the lower end of member 36 and its lower end is bent outwardly and provided with a finger-piece or button 40ᵃ which can be readily depressed by the operator. A pair of coil springs 42 are connected to rod 40 and the lower end of mounting 17 to retract the sliding member 36 with its contact plates so they will be normally held in raised position above the opening 27 in the mounting. This exemplifies a switch in the standard provided with contacts which can be shifted after the contacts on the heater have been inserted into the column to close the circuit through the heater switch. This makes it possible to control the closing of the heater circuit independently of the placement of the container and heater in operative position, and also makes it possible to prevent the sparking between the contacts which usually results when the contacts on the container are brought into engagement with contacts on the standard simultaneously with the placement of the container in its operative position.

A latch 43 of insulating material is fixed to the upper end of a flat spring or resilient strip 44. The lower end of strip 44 is fixed to rod 40. This latch is provided with a tooth 43ᵃ which is adapted to hook over a portion 17ᵇ of mounting 17 below opening 27 to normally lock the vertically slidable member 36 in its raised position. This latch serves to lock the movable contacts carried by the standard in their open position so that they will be normally retained and protected in the upper portion of socket 17ᵃ in the mounting 17 where it is impossible to short circuit these contacts.

The front wall 10ᵃ of column 10 is provided with an opening 18 through which the mounting 17 and all of the parts carried thereby can be inserted into and removed from the column. Mounting 17 is shaped to fit in the column and in the enlarged upper portion of opening 18 so that it will be retained against vertical displacement in the column. Opening 18 is extended as at 18ᵃ so the rod 40 and spring 41 may pass through the front wall of the column, and terminates in a slot 18ᶜ in which rod 40 can slide vertically. This exemplifies a mixer with a mounting for the switch, the shifting device for the switch, the locking device for the switch and the conductors which is insertable and removable through an opening in the front of the column.

To secure the heater against accidental withdrawal while it is in operative position and after the heater switch has been closed, a notch 25ᵇ is formed in the bottom of block 25 with which the upper end of latch 43 will interlock after the button 40ᵃ has been depressed to close the heater switch.

When the mixer is used for hot drinks and the mounting 17 is in the column, a plate 45 which is horizontally concave conformably to the concave front wall of the column, is secured to the column by a screw 46. This plate is provided with an opening 47 through which the contacts 26 and the supporting member 25 on the heater may pass into and out of the mounting 17, and terminates adjacent the upper end of slot 18ᶜ in the column. A strip 45ᵃ has its upper end fixed to the inner side of plate 45 and its lower end spaced from said plate. A screw 45ᵇ spaces the lower end of strip 45ᵃ from plate 45, so that the shoulders 18ᵃ of slot 18ᶜ in the standard will be gripped when the lower end of the plate is slipped downwardly along the standard. This dispenses with a retaining screw for the lower end of the plate. This plate serves to cover the opening 18 in the column and enclose the front of the mounting 17.

When the mixer is to be used with a container without a heater, a plate 19 which fits in the front wall of the column and completely closes the opening 18 in the column is removably secured to the front of the column by screws 46. Plate 19 carries a stud 21 which is adapted to support the bottom of an ordinary container which is not provided with a heater. When the mixer is used for cold drinks, the plate 19 is substituted for the plate 45 to close the opening 18 and provide a container support on the column.

The operation of the improved mixer will be as follows:

During the summer season when the mixer is to be used exclusively for cold drinks, the mounting 17 with the heater-switch will be removed from the column, and plate 19 which carries the stud 21 will be secured to the front of the standard by screws 46. Placement of a container without a heater into position around the agitator from below so the upper margin of the container will be held by hook 15 and its bottom will rest on stud 21, will automatically start the motor, the switch 14 being operable by the container. When the container is removed, the switch will be released and the motor will stop.

During the winter season when it is desired to mix hot drinks, the plate 19 will be removed. The mounting 17 and all heater-controlling devices carried thereby will then be inserted in the column through the opening 18 in the front wall of the column. The front of this block is shaped to fit in said opening so the block will be retained against vertical displacement. Plate 45 will then be secured by screw 46 to the front of the column to hold the switch block in the column. Normally, the heater-switch will be open, the springs 42 serving to hold the slidable switch block 36 in its raised position. Hook 43 which is pressed forwardly by spring plate 44 will overhang the bridge 17$^b$ of the mounting 17 so that the heater-switch will be locked in position where it cannot be closed by switch contacts on the container or accidentally short-circuited. When the container 23 with its heater is placed in operative position, the upper end of the container will pass under hook 15 and close the switch 14 to immediately start the motor, and the block 25 on the holder will be moved backwardly through opening 47 in plate 45 and into recess 27 in the mounting 17. This will move the latch 43 backwardly in the mounting so that hook 43$^a$ will clear bridge 17$^b$ and unlock the button 40$^a$ so it can be depressed to close the heater circuit whenever desired by the operator independently of the placement of the container in its operative position. In some instances it is desired to preliminarily mix the contents of the container before the heater is started. Placement of the holder and container in their operative position will bring contacts 26 on the container in the path of the movable pairs of contact plates 38, 39 on the movable member 36 so that when the button 40$^a$ is depressed, contacts 26 will be gripped between the contact plates 38 and 39 so that a circuit will be established as follows: one of the conductors of cord 32, wire 33, fixed plate 28, its contacting movable plate 38, one of the contacts 26 on the heater, resistance element 24 in the casing 22, the other contact 26, contact plate 39, fixed contact plate 29, wire 34, and the other conductor of cord 32. When the drink has been mixed and heated, the operator will remove the heater and container by first withdrawing member 25 and contacts 26 from mounting 17 sufficiently to clear the standard, and then lowering them to clear the agitator. This will automatically release the motor switch 14 and stop the motor, and the withdrawal of member 25 on the heater from mounting 17 will release the latch 43 so that springs 42 will retract the rod 40 and button 40$^a$ and lift the slidable member 36 with its contacts 38 and 39 so that the terminals at the lower end of said contacts will be out of range of the contacts 26 on the container. Latch 43, when the block 36 is released, will pass into engagement with bridge-piece 17$^b$ and lock the switch in its open position, until the heater is again placed in its operative position. Then the block 25 on the heater, as it is inserted into the column, will push the latch backwardly and automatically release the switch.

At the close of the winter season the mixer may be converted for use with a heaterless container by removing plate 45 and withdrawing the switch block 17 and the parts carried thereby through the front of the column. Conductor cord 33 and switch plug 16$^a$, as well as all of the operative parts of the switch, are carried by the mounting 17 so that they may be inserted as a unit into the column and removed therefrom. In placing the heater switch unit in the column, the cord 32 and plug 32$^a$ are inserted through the opening 18, 18$^a$ in the front of the column. When the mounting 17 has been removed, the plate 19 will be secured to the column and then the mixer will be equipped for mixing cold drinks in a container without a heater.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an electric drink mixer, the combination of a supporting column, an electric motor mounted on the upper end of the column and adapted to drive a depending agitator, means for supporting a container in operative position around the agitator, a switch for controlling the motor, a pair of contacts for closing a heater circuit for the container, carried by the column, and movable into and out of position to engage contacts on the heater, and means, carried by the column, for shifting said pair of contacts.

2. In an electric drink mixer, the combination of a supporting column, an electric motor mounted on the upper end of the column and adapted to drive a depending agitator, means for supporting a container in operative position around the agitator, a switch for controlling the motor, and a pair of vertically slidable contacts for closing a heater circuit for the container, carried by the column, and movable into and out of position to engage contacts on the heater.

3. In an electric drink mixer, the combination of a hollow column, adapted to support at the upper end thereof an electric motor with a depending agitator, means for supporting a container in operative position around the agitator, and a pair of contacts for closing a circuit through a heater for the container, mounted inside of the column, and movable into and out of position to engage contacts on the heater, and means for shifting the contacts in the column.

4. In an electric drink mixer, the combination of a column, adapted to support at the upper end thereof an electric motor with a depending agitator, means for supporting a container in operative position around the agitator, a switch for controlling the motor, a pair of contacts for closing a heater circuit for the container, carried by the column, and movable into and out of position to engage contacts on the heater, and means for locking the contacts on the column against movement.

5. In an electric drink mixer, the combination of a supporting column, an electric motor mounted on the upper end of the column, and adapted to drive a depending agitator, means for supporting a container in operative position around the agitator, a switch for controlling the motor, a pair of contacts for closing a heater circuit for the container, carried by the column, and movable into and out of position to engage contacts on the heater, and means, releasable by the container, for locking the contacts on the column in their off position.

6. In an electric drink mixer, the combination of a column, adapted to support at the upper end thereof an electric motor with a depending agitator, a container provided with an electric heater, contacts connected to and movable with the heater, means for supporting the container in operative position, contacts having means for connection to a source of current, movably mounted on the column and adapted to be shifted into engagement with the contacts on the heater, to close a circuit through the heater, and means for locking the movable contacts on the column in their off position.

7. In an electric drink mixer, the combination of a column, adapted to support at the upper end thereof an electric motor with a depending agitator, a container with an electric heater, contacts connected to and movable with the heater, means for supporting the container in operative position on the column, contacts having means for connection to a source of current movably mounted on the column and adapted to be shifted into engagement with the contacts on said heater, to close a circuit through the heater, and means for locking the contacts on the column, controlled by the placement of the container in its operative position.

8. In an electric drink mixer, the combination of a column, adapted to support at the upper end thereof an electric motor with a depending agitator, a container provided with an electric heater, contacts movable with and connected to the heater, means for supporting the container in operative position on the column, contacts having means for connection to a source of current, movably mounted on the column and adapted to be shifted into engagement with the contacts on said heater, to close a circuit through the heater, and a spring latch for locking the movable contacts on the column, controlled by the placement of the container in its operative position.

9. In an electric drink mixer, the combination of a column, adapted to support at the upper end thereof an electric motor with a depending agitator, a container provided with an electric heater, contacts connected to and movable with the heater, means for supporting the container in operative position on the column, contacts having means for connection to a source of current, movably mounted on the column and adapted to be shifted into engagement with the contacts on the heater, to close a circuit through the heater, and a spring latch for locking the movable contacts on the column.

10. In an electric drink mixer, the combination of a column, adapted to support at the upper end thereof an electric motor with a depending agitator, a container with an electric heater, heater contacts and a supporting member projecting from the side of the container, contacts carried by the column for engaging the contacts on the heater, the column having an opening through which the contacts carried by the heater and said supporting member can be inserted, and means to hold said member when inserted so the container and the heater will be supported in operative position.

11. In an electric drink mixer, the combination of a column, adapted to support at the upper end thereof an electric motor with a depending agitator, a container provided with an electric heater, heater contacts and a supporting member projecting from the side of the container, contacts carried by the column for engaging the contacts on the heater, the column having an opening through which said supporting member can be inserted, and a mounting in the column, recessed to receive said member, so the container with the heater will be supported in operative position.

12. In an electric drink mixer, the combination of a column, adapted to support at the upper end thereof an electric motor with a depending agitator, a container provided with an electric heater carrying contacts and a supporting member projecting from the side of the container, contacts, carried by the column, for engaging the contacts carried by the heater, the column having an opening through which the contacts carried by the heater and said supporting member can be inserted, and a removable mounting in the column having means engageable by said member, so the container with the heater will be supported in operative position.

13. In an electric drink mixer, the combination of a hollow column, adapted to support at the upper end thereof an electric motor with a depending agitator, a container with an electric heater carrying contacts and a supporting member projecting from the side of the container, contacts, carried by the column, for engaging the contacts carried by the heater, the column having an opening through which the contacts carried by the heater and said supporting member can be inserted, and a block in the column having a recess to receive the supporting member and the contacts for the heater so the container with the heater will be supported in operative position.

14. In an electric drink mixer, the combination of a column, adapted to support at the upper end thereof an electric motor with a depending agitator, a container provided with an electric heater, a supporting member projecting rearwardly from the side of the container, contacts on the heater and projecting from said member, contacts carried by the column and adapted to engage the contacts projecting from said member, and means in the column for receiving said projecting member to support the heater and container in operative position.

15. In an electric drink mixed, the combination of a column, adapted to support at the upper end thereof an electric motor with a depending agitator, a container with an electric heater having a supporting member projecting rearwardly from the side of the container, contacts on the heater and projecting from said member, contacts carried by the column and adapted to engage the contacts projecting from said member, and removable means in the column, for engaging said projecting supporting member to support the container in operative position.

16. In an electric drink mixer, the combination of a column, adapted to support at the upper end thereof an electric motor with a depending agitator, a container with an electric heater having a supporting member projecting rearwardly from the side thereof and contacts connected to the heater and projecting from said member, contacts carried by the column and adapted to engage the contacts projecting from said member, and a mounting in the column for said contacts, engageable by said projecting member, to support the heater and container in operative position.

17. In an electric drink mixed, the combination of a column adapted to support at the upper end thereof an electric motor with a depending agitator, a container provided with an electric heater having a supporting member projecting rearwardly from the side of the container and contacts on the heater and projecting from said member, contacts carried by the column and adapted to engage the contacts projecting from said member, and a mounting for said contacts in the column, and having a recess for receiving said projecting member to support the container in operative position and for receiving the contacts on the heater.

18. In an electric drink mixed, the combination of a column, adapted to support at the upper end thereof an electric motor with a depending agitator, a container provided with an electric heater carrying contacts, means for supporting the container in an operative position on the column, and a unit removably mounted on the column and comprising a mounting, contacts movably mounted in the mounting so they can be shifted to engage the contacts on the heater when the container is in its operative position, and means, carried by the mounting, for shifting said movable contacts.

19. In an electric drink mixed, the combination of a column, adapted to support at the upper end thereof an electric motor with a depending agitator, a container with an electric heater carrying contacts, means for supporting the container in an operative position on the column, and a unit, removably mounted on the column and comprising a mounting, contacts movably mounted in the mounting so they can be shifted to engage the contacts on the heater when the container is in its operative position, means, carried by the mounting, for shifting the movable contacts, and a spring for retracting the shifting-means, also carried by the mounting.

20. In an electric drink mixer, the combination of a column, adapted to support at the upper end thereof an electric motor with a depending agitator, a container provided with an electric heater carrying contacts on and connected to the heater, means for supporting the container in an operative position on the column, and a unit, removably mounted on the column, and comprising a mounting, fixed contacts in the mounting, contacts movably mounted in the mounting so they can be shifted to engage the contacts on the heater when the container is in its operative position, and means for shifting the movable contacts, also carried by the mounting.

21. In an electric drink mixer, the combination of a column, adapted to support at the upper end thereof an electric motor with a depending agitator, a container provided with an electric heater carrying contacts, means for supporting the container in an operative position on the column, and a unit, removably mounted on the column and comprising a mounting, contacts movably mounted in the mounting so they can be shifted to engage the contacts on the heater when the container is in its operative position, means, carried by the mounting, for shifting said movable contacts, and means for locking the contacts, also carried by the mounting.

22. In an electric drink mixer, the combination of a column having an upright wall with an opening therethrough, and adapted to support at the upper end thereof an electric motor with a depending agitator, a mounting insertable and removable through said opening and adapted to be secured to the column, contacts carried by the mounting, and a container with an electric heating element carrying contacts adapted to be engaged by the contacts on the mounting when the container is in its operative position.

23. In an electric drink mixer, the combination of a column having an upright wall with an opening therethrough, and adapted to support at the upper end thereof an electric motor with a depending agitator, a mounting insertable and removable through said opening and adapted to be secured to the column, contacts carried by the mounting, and a container with an electric heating element carrying contacts adapted to be engaged by the contacts on the mounting when the container is in its operative position, said mounting being provided with means for supporting the container in operative position.

24. In an electric drink mixer, the combination of a hollow column having an opening in its front wall and adapted to support at the upper end thereof an electric motor with a depending agitator, a mounting insertable into and removable from the column through said opening and adapted to be secured in the column, contacts carried by the mounting, a container provided with an electric heater, and contacts connected to the heater and adapted to be engaged by the contacts on the mounting when the container is in its operative position.

25. In an electric drink mixer, the combination of a hollow column having an opening in its front and adapted to support at the upper end thereof an electric motor with a depending agitator, a mounting insertable and removable through said opening and adapted to be secured to the column, contacts carried by and movably mounted in the mounting, a container provided with an electric heater, and contacts connected to the heater and adapted to be engaged by the contacts on the mounting when the container is in its operative position.

26. In an electric drink mixer, the combination of a hollow column having an opening in its front and adapted to support at the upper end thereof an electric motor with a depending agitator, a switch mounting insertable and removable through said opening and adapted to be secured to the column, contacts carried by and vertically slidable in the mounting, a container provided with an electric heater, and contacts connected to the heater and adapted to be engaged by the contacts on the mounting when the container is in its operative position.

27. In an electric drink mixer, the combination of a hollow column having an opening in its front and adapted to support at the upper end thereof an electric motor with a depending agitator, a mounting insertable and removable through said opening and adapted to be secured to the column, fixed contacts and movable contacts carried by the mounting, and a container with an electric heater and carrying contacts adapted to be engaged by the contacts on the mounting when the container is in its operative position.

28. In an electric drink mixer, the combination of a hollow column having an opening in its front and adapted to support at the upper end thereof an electric motor with a depending agitator, contacts carried in the column opposite the opening and adapted to be engaged by contacts on a container with a heater when such a container is shifted into an operative position on the column, and a plate for closing the opening in the column and covering the contacts when it is adapted to use the mixer with a container without a heater, said plate being secured removably to the column and having means for supporting the heaterless container.

29. In an electric drink mixer, the combination of a hollow column having an opening in its front face and adapted to support at the upper end thereof an electric motor with a depending agitator, a mounting in the column opposite the opening and adapted to be inserted into the column by way of said opening, contacts carried by the mounting and adapted to be engaged by contacts on a container with a heater when the mixer is used with such a container, and a plate for closing the opening and covering the mounting and contacts when the mixer is used with a container without a heater, said plate being secured removably to the column and having means for supporting the heaterless container.

30. In a drink mixer of the character described, the combination of a hollow, vertically extending column adapted to support at the upper end thereof an electric motor with a depending agitator shaft and having an opening in the central portion of the front face thereof, an apertured plate secured to the column so as to cover the aforesaid opening, a pair of contacts disposed within the column and behind the plate and provided with means for connection to a source of electrical current, a container provided with an electric heating element and having associated and movable therewith a pair of contacts for the element, and means for supporting the container in an operative position on the column wherein the contacts for the heating element extend through the aperture in the plate and engage the first mentioned contacts so as to complete a circuit through said element.

31. In a drink mixer of the character described, the combination of a hollow, vertically extending column adapted to support at the upper end thereof an electric motor with a depending agitator shaft and having a concave front face with an opening in the central portion thereof, an apertured plate secured removably to the front face of the column and shaped to cover the opening and so that it is curved conformably to said front face, a pair of contacts disposed within the column and behind the plate and insertable into place through the opening, conductors for supplying electrical current to the contacts, a container provided with an electric heating element and having associated and movable therewith a pair of contacts for the element, and means for supporting the container in an operative position on the column wherein the contacts for the heating element extend through the aperture in the plate and engage the first mentioned contacts so as to complete a circuit through said element.

JOHN W. COX.